United States Patent
Soloway et al.

(10) Patent No.: US 6,819,654 B2
(45) Date of Patent: Nov. 16, 2004

(54) TRUNKING INTER-SWITCH LINKS

(75) Inventors: Stuart R. Soloway, Wrentham, MA (US); Henry S. Yang, Erie, CO (US); David D. Beal, Longmont, CO (US)

(73) Assignee: McData Corporation, Broomfield, CO (US)

( * ) Notice: Subject to any disclaimer, the term of this patent is extended or adjusted under 35 U.S.C. 154(b) by 64 days.

(21) Appl. No.: 10/383,032

(22) Filed: Mar. 6, 2003

(65) Prior Publication Data

US 2003/0165137 A1 Sep. 4, 2003

Related U.S. Application Data

(63) Continuation of application No. 09/964,184, filed on Sep. 25, 2001, now Pat. No. 6,532,212.

(51) Int. Cl.[7] .......................... H04L 12/26; H04L 12/50; G02F 2/00
(52) U.S. Cl. ........................ 370/238; 370/386; 370/232; 370/400; 398/5; 709/232; 709/241
(58) Field of Search ............................... 370/230, 231, 370/232, 235, 236, 237, 238, 239, 253, 386, 389, 392, 400, 412, 414, 458, 221, 225; 709/230, 232, 234, 239, 241; 398/5, 19, 45

(56) References Cited

U.S. PATENT DOCUMENTS

| | | | |
|---|---|---|---|
| 5,282,202 A | * | 1/1994 | Bernstein et al. ........... 370/468 |
| 5,519,695 A | | 5/1996 | Purohit et al. |
| 6,011,804 A | | 1/2000 | Bertin et al. |
| 6,233,236 B1 | | 5/2001 | Nelson et al. |
| 6,240,096 B1 | * | 5/2001 | Book ......................... 370/412 |
| 6,275,492 B1 | | 8/2001 | Zhang |
| 6,532,212 B1 | * | 3/2003 | Soloway et al. ............ 370/230 |

OTHER PUBLICATIONS

American National Standard for Information Systems, "Fiber Channel Fabric Generic Requirements (FC–FG) Rev. 3.5," 7, 1996.
Brocade Communication Systems, Inc. "Fabric Shortest Path First Version 2 (FSPF) Revision 0.2," May 23, 2000.

* cited by examiner

Primary Examiner—Afsar Qureshi
(74) Attorney, Agent, or Firm—Stuart T. Langley, Esq.; William J. Kubida, Esq.; Hogan & Hartson L.L.P.

(57) ABSTRACT

A method and apparatus for routing frames through a fiber channel fabric to make the most efficient possible use of redundant inter-switch links between neighboring switches. The inter-switch links may have different bandwidths. The flow between adjacent switches is monitored to determine various local usage statistics and periodically adjust routing tables to move data flows from congested links to lightly loaded links.

24 Claims, 5 Drawing Sheets

TRUNKING INTER-SWITCH LINKS

CROSS-REFERENCE TO RELATED APPLICATIONS

The present application is a continuation of U.S. patent application Ser. No. 09/964,184, filed Sep. 25, 2001, now U.S. Pat. No. 6,532,212, the disclosure of which is incorporated herein reference.

BACKGROUND OF THE INVENTION

The present invention relates, in general, to the field of Fibre Channel switching technology. More particularly, the present invention relates to systems, methods and software for aggregating several communication links between two switches in a Fibre Channel fabric.

Fibre Channel is a high performance, serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols. Fibre Channel employs a topology known as a "fabric" to establish connections between ports. A fabric is a network of switches for interconnecting a plurality of devices without restriction as to the manner in which the switches can be arranged. A fabric can include a mixture of point-to-point and arbitrated loop topologies.

In Fibre Channel, a channel is established between two nodes where the channel's primary task is to transport data from one point to another at high speed with low latency. The Fibre Channel switch provides flexible circuit/packet switched topology by establishing multiple simultaneous point-to-point connections. Because these connections are managed by the switches or "fabric elements" rather than the connected end devices or "nodes", fabric traffic management is greatly simplified from the perspective of the device.

In many cases, switches are coupled to each other by multiple redundant interswitch links (ISLs). Redundant ISLs improve tolerance to failure of any one ISL. Redundant ISLs can also increase the amount of data that can be communicated between two fabric elements by providing multiple links over which a switch can pass frames. However, the Fibre Channel standards treat each link separately. As a result, routing determinations made by the switch in compliance with Fibre Channel standards may favor one of the redundant links over others, resulting in inefficient use of the available connection bandwidth.

In many cases redundant links have differing bandwidth such that one redundant link may have a 1 gigabit per second capacity while another will have 2 gigabit or ten gigabit. In these cases the Fibre Channel standard routing mechanisms will favor the higher bandwidth one(s) of the redundant links to the exclusion of lower bandwidth links during normal operation. A need exists for systems, methods and software that make efficient use of redundant links between switch pairs and especially between redundant links of different bandwidth.

One difficulty in effecting efficient use of redundant links is that the solutions are desirably compatible with Fibre Channel standards. Standards compatibility ensures that switches from various manufacturers will communicate with each other. A non-standard compliant solution would require changes to both switches in a switch pair in order to operate, essentially restricting the end-user's flexibility in fabric design and equipment choices. Hence, a need exists for solutions that enable efficient use of redundant ISLs while still complying with Fibre Channel protocols.

SUMMARY OF THE INVENTION

A trunking design in accordance with the present invention provides a solution to the aforementioned problems by providing aggregation of links between adjacent switches in an efficient manner. The present invention can be implemented without requiring significant design changes and in a manner that is compatible with existing processes for routing traffic in a Fibre Channel switching environment.

Particularly disclosed herein is a method of routing a flow through a switch in a Fibre Channel fabric. A port coupled to the switch receives traffic. A flow is identified from the traffic using header information and/or receive port information. At least one path is determined for routing the flow through the Fibre Channel fabric. Based upon operating performance information in addition to topology information, the flow is rerouted from a first link in the at least one path to a second link in the at least one path.

In one aspect, the present invention discloses a method of routing a flow on a "shortest path" or lowest cost path in a Fibre Channel fabric. The method first determines one or more shortest paths between a source ID and a destination ID traversing a source switch and a destination switch. For at least one switch, there are at least two links from that switch to one or more adjacent switches on a shortest path to a destination ID. The flow is routed on one of the two links. In response to operating performance information, the flow may be rerouted to another of the two links on a shortest path.

In another aspect, the present invention discloses a method of routing a flow through a switch in a Fibre Channel fabric. A port in the switch receives traffic from the Fibre Channel fabric. Destination identification information identifies a flow. At least one shortest path operative for routing the flow through the Fibre Channel fabric is determined. The flow is then rerouted from a first link to a second link in the at least one shortest path based upon operating performance information in addition to topology information.

In another aspect, the present invention discloses a Fibre Channel switch having a plurality of ports for transmitting and receiving frames. The switch has a first port that is operative for receiving a frame. Embodied within the switch is a first protocol for selecting a second port to receive a frame from the first port. Also embodied within the switch is a second protocol for dynamically switching the selection from the second port to a third port based upon operating performance information in addition to topology information.

BRIEF DESCRIPTION OF THE DRAWINGS

The aforementioned and other features of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

The present invention is illustrated and described in terms of a Fibre Channel fabric and particular Fibre Channel fabric elements (e.g., switches), however, the present invention is readily adapted to other protocols and environments, such as any packet-switched network. Particular examples herein specify data transmission rates and specific values and types of components to ease illustration and understanding. However, these specific examples are not limitations of the present invention unless explicitly indicated to the contrary.

Figure 1:
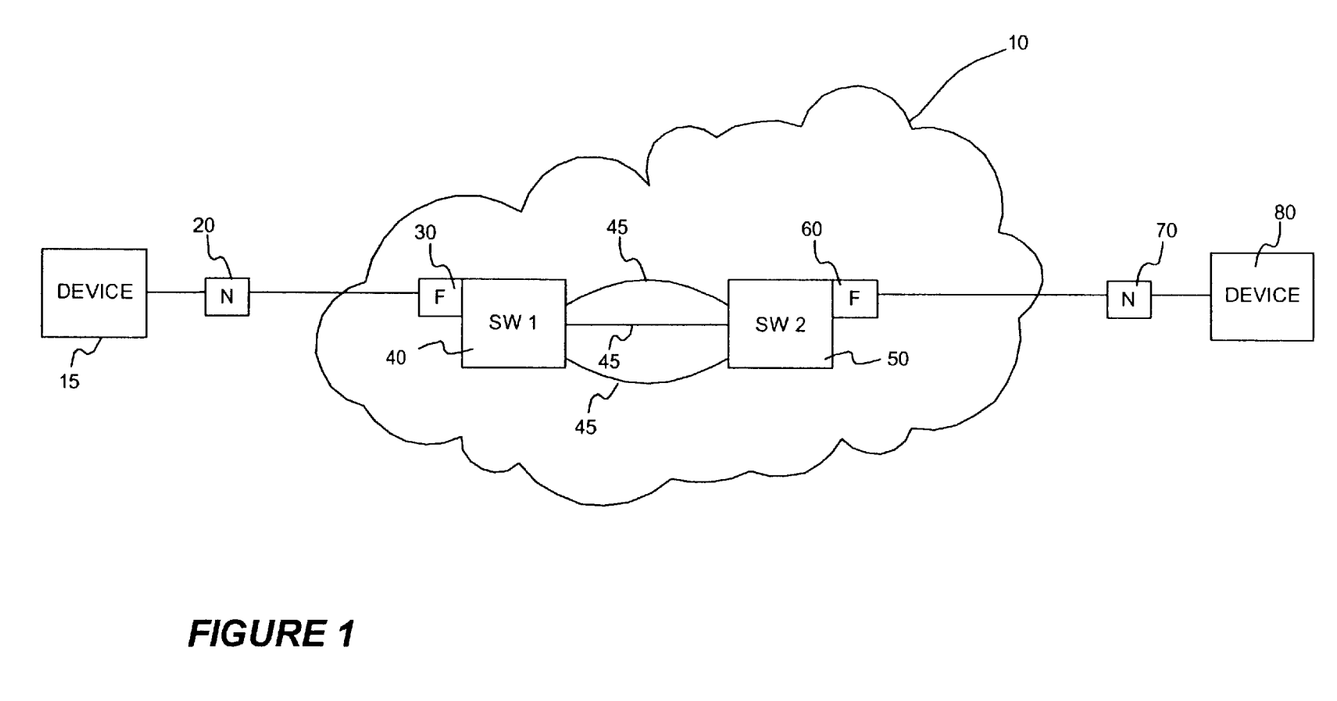
FIG. 1 is a simplified block diagram of a Fibre Channel system illustrating a Fibre Channel fabric for routing traffic from a first device to a second device.

FIG. 1 illustrates a generalized block diagram of a Fibre Channel system having a Fibre Channel fabric 10 for implementing the method and system of the present invention. Device 15 is coupled to node port (N-port) 20 in such a manner that provides a method of coupling device 15 to fabric 10. In a similar manner, device 80 is coupled to N-port 70 for coupling to fabric 10. N-ports 20 and 70 are alternatively referred to as "node ports".

Devices 15 and 80 may comprise disk storage devices, tape storage device devices, computers, computer terminal, peripherals, or other any device that sends or receives frames and otherwise communicates via fabric 10. In the embodiment illustrated in FIG. 1, device 15 is shown as an origination device since it generates and sends frames. Device 80 is illustrated as a receiving or destination device since it receives at least a portion of the generated frames. It should be understood, however, that in most cases any device coupled to an N-Port may be configured both to originate and receive frames.

Device 15 is coupled to Fibre Channel fabric 10 by coupling N-port 20 to fabric port (F-port) 30. F-port 30 comprises link control mechanisms that are addressable by an N-port 20. F-port 30 is typically implemented as a part of a Fibre Channel switch 40. Fibre Channel switch 40 comprises mechanisms and processes for interconnecting various N-ports attached to it and is capable of routing frame traffic through fabric 10 using destination identification (D_ID) information in the frames.

Although a fabric 10 may contain a single switch 40, the present invention is particularly directed to fabrics comprising two or more switches such as switch 40 and switch 50. In the illustrated embodiment, switch 40 is coupled to a single switch 50 over a plurality of inter-switch links (ISLs) 45. Switch 50 is coupled to F-port 60 that couples fabric 10 to the destination device 80 through N-port 70.

In FIG. 1, only two switches are illustrated in Fibre Channel fabric 10. As one skilled in the art can appreciate, any number of Fibre Channel switches may be used to route traffic from originating device 15 to destination device 80 through fabric 10. Moreover, each switch need not be directly connected to every other switch in a fabric. In addition, although three ISLs are illustrated for coupling switch 40 to switch 50, any number of ISLs may be provided to meet the needs of a particular application.

Figure 2:
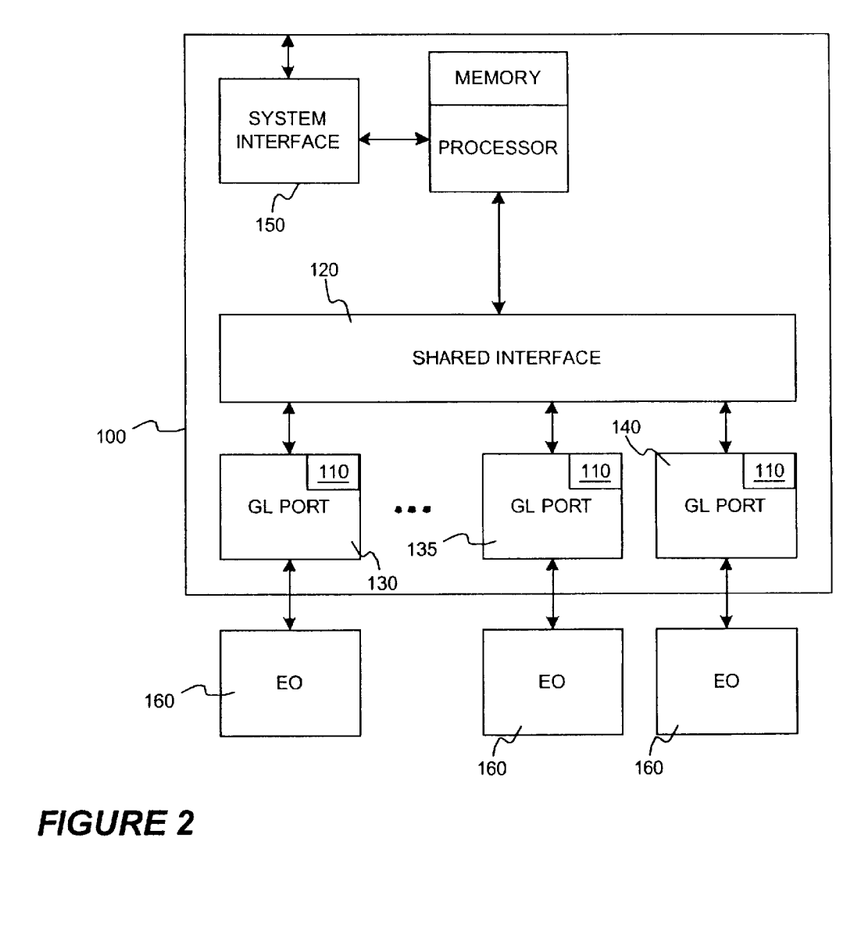
FIG. 2 is a block diagram of a switching element, wherein the switching element has a plurality of Fibre Channel ports each having a route table and a microprocessor or microcontroller and volatile/non-volatile memory coupled to the processor.

FIG. 2 shows a generalized block diagram of a Fibre Channel switch 100, also referred to as a fabric element, for use in a Fibre Channel fabric 10. Switch 100 shown in FIG. 2 may be used to implement switches 40 and 50 in FIG. 1, or switches 300, 303, 310, and 305 shown in FIG. 3, for example. In one embodiment, the Fibre Channel switching element 100 of FIG. 2 may be implemented on a single application specific integrated circuit (ASIC). Typically switch 100 includes a data processor such as a microprocessor or microcontroller and volatile/non-volatile memory coupled to the processor and configured to execute stored instructions. The instructions implement the various protocols and data structures described herein. The processor may be coupled to any of the other components and resources within switch 100, such as GL Ports 130, 135 and 140, to implement specific program behavior.

Fibre Channel switch 100 has a plurality of ports for receiving and transferring data through the switch. In FIG. 2, the ports are illustrated as GL-ports 130, 135 and 140. In one embodiment, switch 100 comprises 24 GL_Port modules. Each GL_Port is coupled to shared memory 120 and external optical interface 160. External optical interface 160 couples switch 100 to a corresponding optical interface of a particular N-Port.

Each GL-Port associated with Fibre Channel switch 100 has a route table 110 operatively coupled thereto. Route table 110 provides a translation or mapping from each possible Destination ID (D_ID) value to the appropriate exit port. In some cases, route table 110 provides for hard zoning, which is the capability for blocking traffic from certain receive ports to certain D_IDs.

GL_Ports 130, 135 and 140 transmit and receive Fibre Channel frames to and from the switch and to and from the Fibre Channel fabric. A GL_Port may be selectively configured to function as an expansion port (E_Port), an F_Port or a fabric loop port (FL_Port), for example. An E_Port is an expansion port that serves as a physical interface within the fabric that is used to create multi-switch fabrics by attaching another switch's E_Port through an ISL. An F_Port is a fabric port that operates as a physical interface within the fabric that attaches to an N_Port of a destination device through a point-to-point link connection. An FL_Port is a fabric loop port that contains arbitrated loop (AL) functions associated with the FC-AL topology. FC-AL is a Fibre Channel topology where ports use arbitration to establish a point-to-point circuit.

Figure 3:
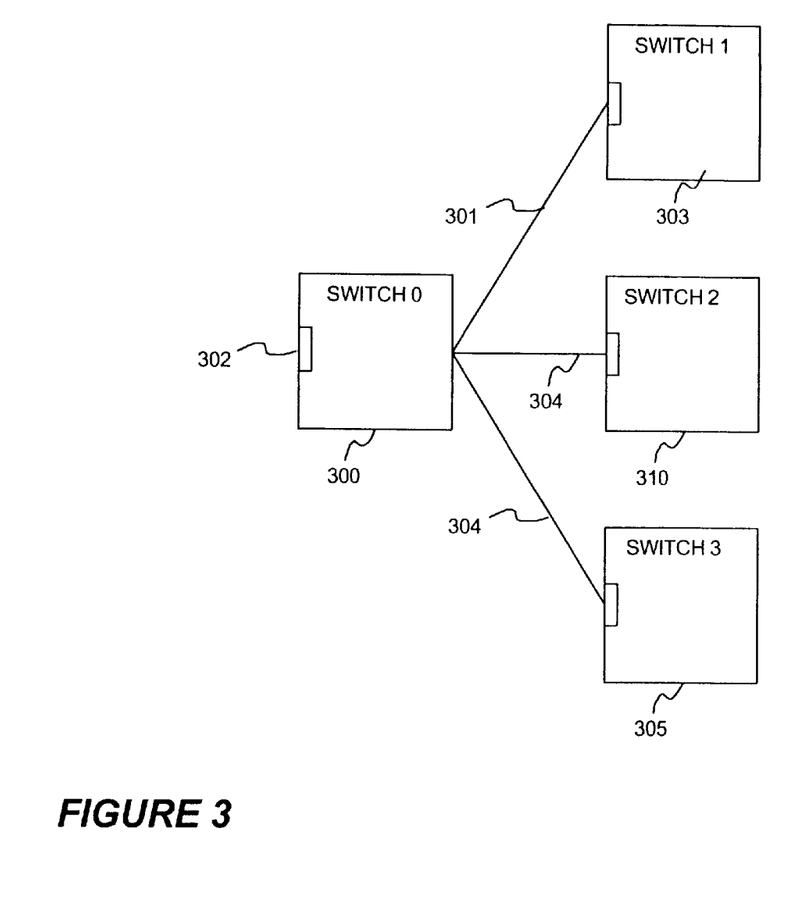
FIG. 3 is a block diagram illustrating several Fibre Channel switches and several possible paths between the switches.

FIG. 3 illustrates a first switch 300 and a plurality of switches 303, 305 and 310 that may be utilized for establishing a path and transmitting traffic in a Fibre Channel fabric. For example, a frame arrives on receive port 302 of switch 300 destined for a particular destination switch. The frame has a unique identifier or address that identifies a destination location. Using the identity of the destination identifier, a protocol embodied on switch 300 determines one or more shortest paths to the destination. In one embodiment, switch 300 uses a fabric shortest path first (FSPF) protocol.

In the illustrated embodiment of FIG. 3, switch 300 has three candidate neighboring switches 303, 305 and 310 for establishing a path, shown as paths 301, 304 and 308 respectively. A switch is considered a neighboring switch if one or more inter-switch links couple the switches together. Neighboring switches may be referred to as switch pairs. Any one of the switch pairs illustrated in FIG. 3 may be used to route a frame arriving on receive port 302 of switch 300.

A routing protocol is a process implemented within a switch that selects which path is used for a particular frame based on the D_ID associated with that frame. A path comprises a set of one or more switches having links between them that when combined provide a complete path from a source N-Port to a destination N-Port, or from an intermediate switch to a destination. While the routing protocols conceptually take into consideration shared knowledge about all of the switches between a source and destination, in practice the routing protocol of any given switch is primarily responsible for selecting an output port upon which to route a given received frame. In a Fibre Channel environment, for example, each switch executes a similar routing protocol in parallel with the other switches and has a similar set of shared information. In this manner the switches manage to pass frames from switch to switch to a switch that is coupled to an N-Port identified by the D_ID in the frame header.

Figure 4:
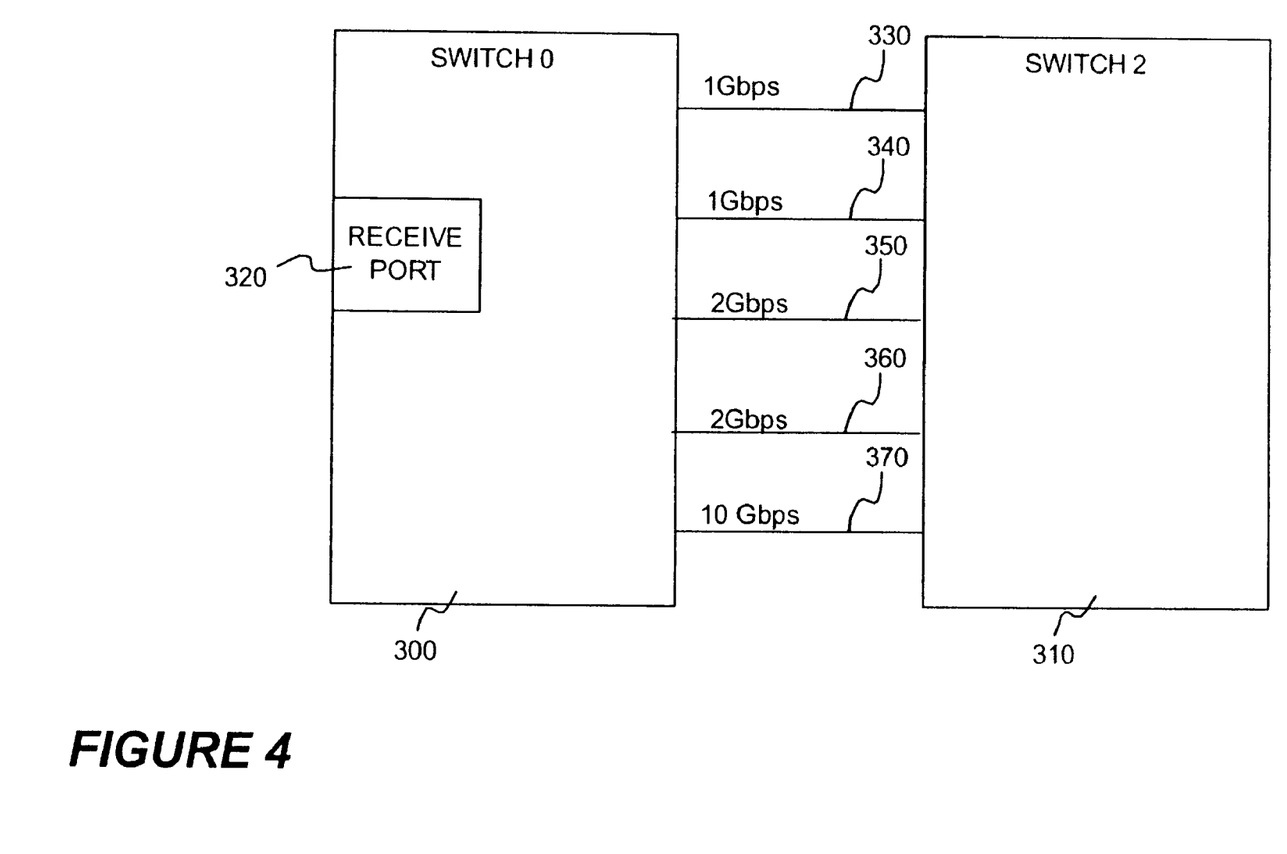
FIG. 4 is a block diagram of a switch pair and a plurality of inter-switch links.

Within the context of FIGS. 3 and 4, a link comprises a connection between two nodes of a fabric. More particularly, a link is a physical or logical point-to-point connection from one element of a Fibre Channel fabric to the next. A physical point-to-point connection comprises both electrical and optical datalink technologies. A logical link is any end-to-end collection of physical links in a logical point-to-point connection including but not limited to switches, loops, or bridges to name a few. A path, as that term is used to describe the present invention, is different from a link. A path is any interconnect route that allows two devices or a device and a switch to communicate.

A routing protocol, for example, is aware of devices that are reachable via a shortest path through switch 303, and will select path 301 to forward frames from switch 300 to switch 303. For example, the N-ports coupled to switch 303 may be allocated a range of D_ID addresses, and each other switch holds a routing table associating that range of addresses with switch 303. A different protocol may be used, however, where there are multiple or redundant paths that lead to an N_Port associated with a particular D_ID.

Fibre Channel shortest path first (FSPF), also called "fabric shortest path first" is an example of a different path selection or routing protocol implemented in each fabric switch that determines an exit port based on a particular frame's D_ID and shared knowledge of fabric connectivity and cost. FSPF is a link-state routing protocol where each switch maintains a database describing a portion of the fabric topology that is relevant to that switch. The switches share the local state throughout the system by various forms of inter-switch communication. In essence, for any received frame, FSPF allows a receiving switch to determine one or more switches that are members of a shortest path between the receiving switch and a switch coupled to an N-port associated with the D_ID value specified in the frame.

The FSPF protocol keeps track of the state of the links on all switches in the fabric. It also associates a cost with each link. The cost associated with a link is assigned based on the bandwidth or data carrying capacity of the link such that higher bandwidth links have a lower cost than lower bandwidth links. In comparing redundant links or paths, the FSPF protocol computes paths from a switch to all the other switches in the fabric by adding the cost of all the links traversed by the path. The protocol chooses a path that minimizes the cost.

FSPF protocol has four major components. FSPF provides a Hello protocol that is used to establish connectivity with a neighbor switch, establish the identity of the neighbor switch, and exchange FSPF parameters and capabilities. In addition, FSPF protocol provides a replicated shortest path topology database, with the protocols and mechanisms to keep the databases synchronized across the fabric. FSPF protocol also provides a routing table update and a path computation algorithm. More details on the FSPF protocol can be found in ANSI draft standard T11 FC-SW2 Rev. 5.3, which is hereby incorporated by reference for all purposes.

A significant limitation of the FSPF protocol is that it strongly favors lower cost links in the selection amongst redundant links. As a result, traffic may be inefficiently allocated to low cost links up until a point where the link performance degrades severely or the link becomes unusable.

FIG. 4 is a block diagram showing a switch pair in a Fibre Channel fabric. Fibre Channel switch 300 is coupled to Fibre Channel switch 310 through a plurality of redundant inter-switch links (ISL's). In the illustrated example, five inter-switch links are illustrated having different data rates for transmitting traffic. As shown, ISL 330 and ISL 340 transmit traffic at a rate of 1 Gbps; ISL 350 and ISL 360 transmit at a rate of 2 Gbps; and ISL 370 transmits at a rate of 10 Gbps. However, one skilled in the art will appreciate that any combination of number of links and speed across the links may be chosen without departing from the teachings of the present invention.

In accordance with FIG. 4, the trunking feature of the present invention makes efficient use of the redundant ISLs between neighboring switches 300 and 310. Trunking refers generally to methods that manage the available communication bandwidth of the plurality of redundant links in aggregate, rather than individually. In one sense, trunking effects a type of load balancing on such links, although absolute equity or balancing in load is not a primary consideration of the present invention.

In accordance with the present invention, a protocol within a switch (e.g., switch 300 and/or switch 310) monitors various local usage statistics and periodically adjusts routing tables to move data "flows" from congested links to lightly loaded links. In a sense, the protocol in accordance with the present invention overrides the routing determined by, for example, the FSPF protocol. In this manner, the present invention delivers a frame to a switch on the path determined by the FSPF protocol via a link that may not be on the path determined by the FSPF protocol. More particularly, an alternate ISL used to reroute a data "flow" does not necessarily have to be part of the "shortest path" to the flow's destination determined by FSPF protocol, the alternate ISL only needs to couple to an adjacent switch that is on a determined "shortest path." The protocol need only be implemented in a single switch or any combination of switches, without requiring changes in fabric topology.

A significant feature of the present invention is that routing and re-routing decisions are preferably made on a flow-by-flow basis rather than a frame-by-frame basis. A flow is broadly defined as a sequence of received frames that meet certain selection criteria applied to the header information and receive port of each frame. The header information considered may include link, network, and higher-layer headers to name a few. The selection criteria may be such that the set of transmit links allowed by the routing algorithm is the same for all frames in the flow.

In another embodiment, a flow is defined by a sequence of frames identified by the values of specified bits in the source and destination fields of the frames and by the receive port such that the set of transmit links allowed by a routing algorithm is the same for all frames in the flow. In still another embodiment, a flow is defined by a sequence of Fibre Channel frames identified by the values of specified bits in the source ID and D_ID fields of the frames and by the receive port such that all eight bits of the domain part of the D_ID are included in the "specified bits" (frames to different domains are in different flows). In yet another embodiment, a flow is defined as a sequence of Fibre Channel frames identified by the domain part of the D_ID field of the frames and the receive port.

In a particular implementation, all frames for a given domain arriving on a given receive port of a switch are said to be in the same flow. The domain is defined by a number of bits in a fiber channel identification address that identifies the intended destination switch. For example, a given switch may support a range of 256 identification addresses in which case a domain may be defined in a particular switch by the most-significant 8 bits of the D_ID address (which are the same for all ports of the particular switch).

Flow-by-flow routing and rerouting offers significant benefits in allowing for efficient use of redundant links without incurring a high rate of out-of-order packet delivery. Out-of-order delivery is a significant problem when frames that belong to a common exchange are transmitted over different links. Link bandwidth, congestion, and other factors that vary from link to link allow newer frames to be delivered before older frames. Frame-by-frame routing increases the likelihood of out-of-order delivery because frames are scattered across available links. In contrast, by routing on a flow-by-flow basis, related frames will be routed and rerouted together across a selected link.

Load-balancing among ISLs 330, 340, 350, 360 and 370 in accordance with the present invention requires no configuration by the user, other than enabling the trunking aspect of the present invention. In particular, there is no need to manually configure the ISLs of FIG. 4 into "trunk groups" of redundant links that can offload each other. Instead, candidate links for rerouting of a flow are identified automatically from a topology database maintained by the FSPF protocol.

All ISLs that lead to adjacent switches on the shortest path to the flow's destination are considered when rerouting flows to that destination. For example, when the FSPF protocol determines that ISL 370 is the shortest path to switch 310, a flow may be rerouted onto ISL 330, 340, 350 or 360 since each ISL couples switch 300 to switch 310. In other words, even if a link is not on the FSPF-determined path to a flow's destination, the flow may be routed onto the link to relieve congestion.

In another aspect of the invention, a flow may be rerouted onto a link that couples a different adjacent switch than the adjacent switch in the "shortest path" identified by the FSPF protocol. The FSPF protocol may determine that the shortest path is identical between a first switch and two neighboring switches, and base the selection of the switch on the highest bandwidth link or any other arbitrary static criterion. Because the present invention enables evaluation and use of each link in one or more shortest paths determined by FSPF, it is therefore possible to reroute data between links that do not connect the same two neighboring switches. The only requirement is that both links go to switches that are on shortest paths to the destination.

Referring to FIG. 4, switch 300 monitors the traffic passing into and out of the various ports, particularly the amount of traffic sent on each ISL and the amount of traffic received in each flow. More particularly, switch 300 is running a rerouting algorithm to determine if flows should be rerouted from a heavily loaded ISL to a lighter loaded ISL. In a particular example, ISL loading is determined by maintaining an estimated transmit frame size and average transmit frame rate for every ISL. In one embodiment, the rerouting algorithm dynamically determines routing every forty-five seconds.

A data structure is maintained that includes an entry for every flow being handled by a switch, and various statistics for that flow. Examples of such statistics could be long term average data rate and short term average data rate to name a few. In operation, the trunking or rerouting algorithm searches the flow data structure analyzing every entry with non-negligible throughput. In one embodiment, non-negligible throughput is set at 2 characters per second. For every entry the algorithm queries what, if any, alternate outgoing link the rerouting criteria described below allow for the rerouting of the flow onto an alternate ISL. If certain rerouting criteria are satisfied, the flow is rerouted to an alternate ISL. Preferably, there is some randomness in the order for scanning the data structure, thereby minimizing the possibility of creating rerouting cycles in which the same sequence of flows is rerouted back and forth to various links. In one embodiment, the scanning is round-robin.

The switch uses specific operating performance information in making a decision to reroute a flow from a first ISL to a second ISL. It should be understood that current fabric topology and port designation are not included in operating performance information. One determination in operating performance information is link traffic, more particularly that traffic may only be rerouted from a congested outgoing link or from a metered-off outgoing link. For a link to be congested, its loading must be greater than a first congestion threshold, which is configurable for each link. The first congestion threshold assists in the decision to reroute from or "off" a first ISL. A congestion threshold is defined as a percentage of bandwidth on a link in relation to the total available amount of bandwidth available on the link. A link is metered off if, for a threshold portion of the time, the link is unable to transmit due to lack of available resources. For example, in a credit-based flow control system where credits determine the number of frame buffers available in the receiving port of the link, a link may be metered off when insufficient credits exist over a minimum threshold of the time to transmit the flow.

Traffic is preferably rerouted to a link whose data rate will be below a second congestion threshold after the reroute, such that the current data rate plus the flow's data rate is less than the congestion threshold. The second congestion threshold assists in the decision to reroute to or "on" a second ISL. Traffic should also not be rerouted onto a link that is metered-off, as that term is described above. Operating performance information decrease the likelihood of rerouting onto a link that will provide lower quality of service than the link to which the flow is currently allocated. A flow should not be rerouted if it has been rerouted once in a certain period of time, which in one embodiment is 1 minute. This operating performance information discourages over-anxious rerouting that might result in ping-pong rerouting between links.

The present invention involves evaluation of a cost function across multiple redundant links. It should be understood that the cost function of the present invention differs significantly from the concept of link cost used by the FSPF protocol. Whereas a link cost in FSPF relates to a single link and is determined largely by bandwidth and so is statically defined by the physical attributes of the link, the present invention uses a dynamic cost function that accounts for the current loading of redundant links and the corresponding link speeds.

The cost function should improve on the "old link" by an amount sufficiently greater than the increase on the "new link" for the proposed reroute. The projected increase in the cost function on the new link is computed as the difference between its current cost function and its cost function once the throughput of the candidate flow is added in. The projected decrease in the cost function on the old link is computed as the difference between its current cost function and its cost function once the throughput of the candidate flow is subtracted. If the latter decrease is more than a stability factor times the former increase, the reroute is allowed.

The cost function generally is a function of the capacity of a link and a measured or predicted data rate. The cost function equation can be expressed as follows:

$$\text{Loading}^2/(\text{bandwidth}*(\text{bandwidth-loading}))$$

Bandwidth is the capacity of the link and loading is the measured or predicted utilization of the link. A reroute may be undertaken if the predicted increase in the cost function on the "new link" multiplied by a stability factor is less than the predicted decrease in the cost function on the "old link." The default value of the stability factor) is 1.1.

Referring again to FIG. 4, assume that an FSPF protocol operating on switch 300 selects a path between switch 300 and 310 as at least one "shortest path" for purposes of routing a frame for a particular flow. More particularly, ISL 370 is chosen as the link on the shortest path between switch 300 and 310. Traffic is therefore routed on ISL 370.

The rerouting algorithm in accordance with the present invention running on switch 300 determines that one or all rerouting criteria is satisfied, thereby indicating a reroute to another ISL. The switch computes the cost function for the current ISL and the prospective ISL. More particularly, on the current ISL, the value of the current traffic load is computed along with the value of the current load subtracting the potentially rerouted flow. On the prospective ISL, the value of the current traffic load is determined along with the value of the current traffic load adding the potentially rerouted flow. If the cost function improves on the current ISL more than a stability factor multiplied by an amount it degrades on the prospective ISL by rerouting the flow to the prospective ISL, for example ISL 350 operating at 2 Gbps, the flow may be rerouted (assuming other rerouting criteria are satisfied). It should also be understood that the algorithm checks all available ISL's meeting the rerouting criteria and reroutes to an ISL that best improves the cost function.

Figure 5:
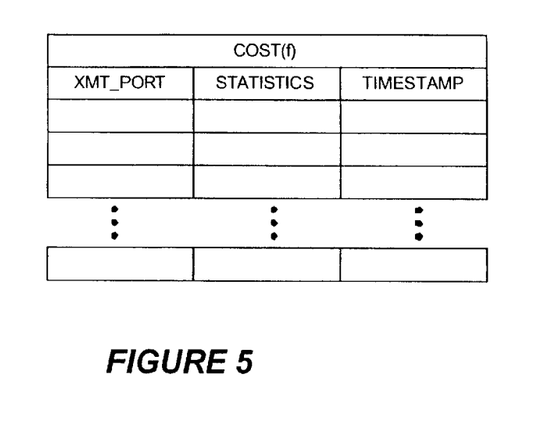
FIG. 5 illustrates a data structure residing in a switch for recording a plurality of flows.

FIG. 5 illustrates one embodiment of a flow data structure associated with switch 100. As shown, the data structure comprises a number of entries where each entry corresponds to a flow and associated values for the transmit port of the flow (xmt_port), the statistics used to compute a short-term and long-term filtered value for a frame rate (statistics) and the time the flow was last rerouted (timestamp). The data structure comprises an entry for each of the flows passing through the switch. Destination identification bits as well as a receive port in a frame define a frame's flow.

In a Fibre Channel environment, the destination address comprises 3 bytes: domain, area and port ID. In a particular implementation, only the domain byte is used to define flows, although it is contemplated that by using some or all of the area and/or port ID bytes to increase granularity, flows can be broken into more efficient sizes for rerouting. Statistics such as average frame rate, estimated frame size, latency and the like are maintained on a flow-by-flow basis. It is contemplated that the flow data structure shown in FIG. 5 may be implemented in a distributed fashion amongst a plurality of data structures that maintain statistics of various ISLs.

Statistics for the various flows are preferably maintained and updated frequently, although the precise frequency will vary from implementation to implementation. In a particular implementation, both a long-term exponentially filtered average and a short-term average are used for the flow's data rate. When contemplating a reroute from a higher data-rate link to a lower data-rate link, the maximum of a short term average of the flow's data rate and the exponential average are used in the computation. Such a method minimizes a route ping-pong effect when a flow suddenly increases its data rate. In all other cases, the filtered average is used.

However, it is contemplated that various statistical techniques may be readily applied. For example, averaging algorithms that react more quickly to an instantaneous burst may handle bursty data better or averaging algorithms that compute the average over the past n seconds (for some time value n) may be preferable.

Figure 6A:
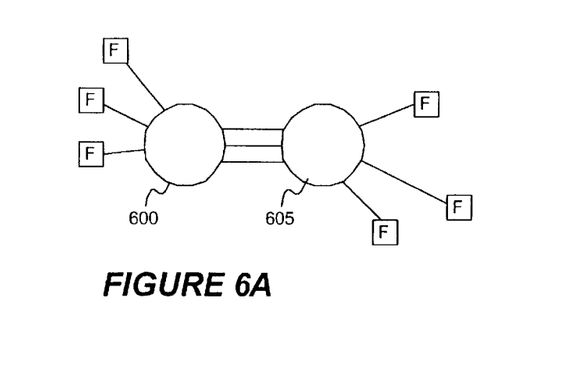
FIGS. 6A–6C illustrate various topological designs of a Fibre Channel fabric for implementing aspects of the present invention.
Figure 6B:
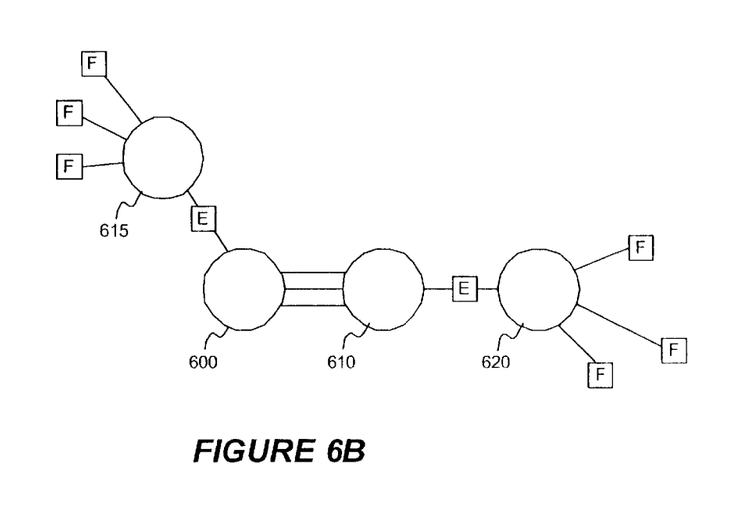
Figure 6C:
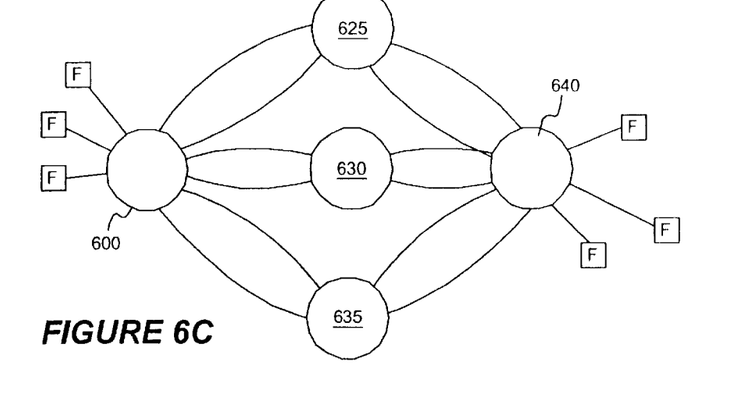

Numerous topological designs may be used to implement various aspects of the disclosed invention without departing from its intended scope including, but in no way limited to, the examples illustrated in FIGS. 6A–6C. FIG. 6A illustrates a simple fabric topology having switch 600 and switch 605, where each switch has multiple F-ports. One or both switches may implement the protocol of the present invention. FIG. 6B differs from FIG. 6A in that switch 600 couples to switch 615 and switch 610 couples to switch 620 over one or more E-Ports. FIG. 6C differs further in that it illustrates a more complex fabric. In the illustrated fabric, any number of paths may be selected between switch 600 and any of a multiple number of switches 625, 630 and 635 leading to a common switch 640.

While there have been described above the principles of the present invention in conjunction with a specific embodiment, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein.

Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method of routing a flow through a switch in a fibre channel fabric comprising:

receiving traffic at a port coupled to said switch;

identifying said flow from said traffic using header information;

determining at least one path operative for routing said flow through said fibre channel fabric; and rerouting said flow from a first link in said at least one path to a second link in said at least one path based upon operating performance information in addition to topology information.

2. The method of claim 1, wherein said at least one path comprises a plurality of paths from said switch to at least one adjacent switch.

3. The method of claim 2, wherein said at least one adjacent switch comprises at least two adjacent switches.

4. The method of claim 1, wherein said act of determining at least one path comprises determining at least one shortest path.

5. The method of claim 1 wherein said flow comprises a plurality of data frames arriving on a receive port associated with said first switch, wherein said data frames are to be routed to a destination switch in said fabric based upon said header information.

6. The method of claim 1 wherein said operating performance information comprises a congested link condition.

7. The method of claim 6 wherein said congested link condition comprises a first condition resulting from an additional flow on said first link resulting in said first link exceeding a first congestion threshold, wherein said first congestion threshold defines a percentage of bandwidth on said first link in relation to the total available amount of bandwidth on said first link.

8. The method of claim 1 wherein said operating performance information comprises a metered off first link condition.

9. The method of claim 1, wherein said header information comprises a domain portion of a destination identification information.

10. The method of claim 1, wherein said act of identifying said flow from said traffic using header information further comprises identifying said flow using receive port information.

11. A method of routing a flow on at least one path in a fibre channel fabric, said at least one path comprising a source switch and a destination switch, wherein at least one switch pair in said at least one path is coupled by a plurality of links, said method comprising:

determining said at least one path between said source switch and said destination switch;

routing said flow over a first link coupling said at least one switch pair in said at least one path, said at least one switch pair having the same originating switch; and rerouting said flow to a second link coupling said at least one switch pair based upon operating performance information in addition to topology information.

12. The method of claim 11, wherein said first link comprises a link from said originating switch to a first switch and said second link comprises a link from said originating switch to a second switch.

13. The method of claim 11, wherein said act of determining at least one path comprises determining at least one shortest path.

14. The method of claim 11 wherein said act of determining said at least on path comprises determining a shortest path using a fibre channel shortest path first (FSPF) algorithm.

15. The method of claim 14 wherein said FSPF algorithm comprises:

assigning a cost to each of said plurality of links, wherein said cost is proportional to a reciprocal of bandwidth; and determining one or more links from said plurality of links that provides a lowest cost.

16. The method of claim 11 wherein said flow comprises a plurality of data frames arriving on a receive port associated with said switch pair, wherein said data frames are to be routed based upon header information and receive port information.

17. The method of claim 16 wherein said header information comprises a portion of said destination identification.

18. The method of claim 11 wherein said operating performance information comprises a congested link condition.

19. The method of claim 18 wherein said congested link condition comprises a first condition resulting in said first link exceeding a first congestion threshold, wherein said first congestion threshold defines a percentage of bandwidth on said first link in relation to the total available amount of bandwidth on said first link.

20. The method of claim 11 wherein said operating performance information comprises a metered off first link condition.

21. The method of claim 20 wherein said metered off first link condition comprises a condition resulting from a portion of time that said first link is unable to transmit due to lack of available resources to handle said flow.

22. The method of claim 21 wherein said lack of available resources is measured by credits, wherein said credits determine the number of frame buffers available in the receiving port of said first link.

23. The method of claim 11 wherein said operating performance information comprises a condition where the delay of said first link exceeds a predetermined threshold.

24. A method for routing a plurality of packets through a switch in a packet-switching network comprising:

identifying a flow from said plurality of packets;

determining at least one shortest path operative for routing said flow through said packet-switching network, wherein said at least one shortest path comprises a first link and second link; and rerouting said flow from said first link to said second link based upon operating performance information in addition to topology information.

* * * * *